(12) United States Patent
Palanki et al.

(10) Patent No.: US 9,031,053 B2
(45) Date of Patent: May 12, 2015

(54) METHOD AND APPARATUS FOR COMMUNICATING IN A RELAY COMMUNICATION NETWORK

(75) Inventors: Ravi Palanki, San Diego, CA (US); Avneesh Agrawal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 644 days.

(21) Appl. No.: 12/257,265

(22) Filed: Oct. 23, 2008

(65) Prior Publication Data

US 2010/0103858 A1    Apr. 29, 2010

(51) Int. Cl.
*H04B 7/155* (2006.01)
*H04B 7/26* (2006.01)
*H04W 56/00* (2009.01)

(52) U.S. Cl.
CPC ........ *H04B 7/15507* (2013.01); *H04B 7/15585* (2013.01); *H04B 7/2606* (2013.01); *H04W 56/001* (2013.01)

(58) Field of Classification Search
CPC ........... H04B 7/15585; H04B 7/15507; H04B 7/2606; H04W 56/001
See application file for complete search history.

(56) References Cited

U.S. PATENT DOCUMENTS

| | | | |
|---|---|---|---|
| 6,704,301 B2* | 3/2004 | Chari et al. | 370/351 |
| 6,728,514 B2* | 4/2004 | Bandeira et al. | 455/13.1 |
| 7,079,509 B2* | 7/2006 | Belcea | 370/330 |
| 7,224,702 B2* | 5/2007 | Lee | 370/473 |
| 7,266,104 B2* | 9/2007 | Belcea | 370/338 |
| 7,277,457 B2* | 10/2007 | Gorday et al. | 370/509 |
| 7,397,789 B2* | 7/2008 | Chari et al. | 370/351 |
| 7,535,862 B2* | 5/2009 | Patwardhan | 370/312 |

(Continued)

FOREIGN PATENT DOCUMENTS

| | | |
|---|---|---|
| CN | 1658532 A | 8/2005 |
| CN | 1983863 A | 6/2007 |

(Continued)

OTHER PUBLICATIONS

Hasan A et al: "Clustered CDMA ad hoc networks without closed-loop power control" IEEE Military Communications Conference, vol. 2, Oct. 13, 2003 (Oct. 13, 2003), pp. 1030-1035, XP010698629 New York, NY : IEEE, US ISBN: 978-0-7803-8140-7 abstract; figures 1,2 p. 1030-p. 1034.

(Continued)

*Primary Examiner* — Gregory Sefcheck
(74) *Attorney, Agent, or Firm* — Peng Zhu

(57) ABSTRACT

Techniques for transmitting data in a relay communication network are described. In an aspect, stations in the relay network may be grouped into multiple depths, and stations at each depth may send the same transmission in each time interval. Packets may be transmitted in a pipelined manner in the relay network. Transmissions of a packet may be sent by stations at progressively higher depth in successive time intervals. A station may perform auto-configuration, attempt to decode transmissions from stations at different depths, and determine its depth based on decoding results. In another aspect, stations at each depth may transmit the same synchronization signal, and stations at different depths may transmit different synchronization signals. In one design, the synchronization signals for different depths may be different pilots, which may be generated with different scrambling codes or different orthogonal codes or may be multiplexed in frequency and/or time.

11 Claims, 10 Drawing Sheets

(56) References Cited

U.S. PATENT DOCUMENTS

| | | | |
|---|---|---|---|
| 7,573,875 B2* | 8/2009 | Cankaya | 370/390 |
| 7,596,126 B2* | 9/2009 | Riddington et al. | 370/342 |
| 7,689,224 B2* | 3/2010 | Chari et al. | 455/445 |
| 7,729,336 B2* | 6/2010 | Pun et al. | 370/350 |
| 7,826,337 B2* | 11/2010 | Shi et al. | 370/201 |
| 8,634,769 B2* | 1/2014 | Palanki et al. | 455/13.1 |
| 8,861,423 B2* | 10/2014 | Li et al. | 370/315 |
| 2005/0074036 A1* | 4/2005 | Gorday et al. | 370/513 |
| 2006/0050662 A1* | 3/2006 | Rizvi et al. | 370/320 |
| 2006/0067232 A1* | 3/2006 | Lee et al. | 370/235 |
| 2006/0227748 A1* | 10/2006 | Stamoulis et al. | 370/332 |
| 2006/0268676 A1 | 11/2006 | Gore et al. | |
| 2006/0270438 A1* | 11/2006 | Choi | 455/522 |
| 2007/0129008 A1 | 6/2007 | Shi et al. | |
| 2007/0211703 A1* | 9/2007 | Gu et al. | 370/356 |
| 2008/0025323 A1 | 1/2008 | Khan | |
| 2008/0075094 A1 | 3/2008 | Ahn et al. | |
| 2008/0112350 A1* | 5/2008 | Nanda et al. | 370/312 |
| 2008/0113616 A1 | 5/2008 | Kim et al. | |
| 2008/0123584 A1* | 5/2008 | Behrendt et al. | 370/315 |
| 2008/0240073 A1* | 10/2008 | Pun et al. | 370/350 |
| 2009/0003257 A1* | 1/2009 | Kumar et al. | 370/314 |
| 2009/0264142 A1* | 10/2009 | Sankar et al. | 455/501 |
| 2010/0008282 A1* | 1/2010 | Bhattad et al. | 370/312 |
| 2010/0020771 A1* | 1/2010 | Ji et al. | 370/336 |
| 2010/0048212 A1* | 2/2010 | Yavuz et al. | 455/436 |
| 2010/0080139 A1* | 4/2010 | Palanki et al. | 370/252 |
| 2010/0080166 A1* | 4/2010 | Palanki et al. | 370/315 |
| 2010/0105317 A1 | 4/2010 | Palanki et al. | |
| 2010/0150079 A1* | 6/2010 | Maltsev et al. | 370/329 |
| 2011/0085611 A1* | 4/2011 | Laroia et al. | 375/260 |
| 2012/0127914 A1* | 5/2012 | Tan et al. | 370/315 |
| 2012/0294224 A1* | 11/2012 | Silva et al. | 370/315 |

FOREIGN PATENT DOCUMENTS

| | | |
|---|---|---|
| CN | 101179326 A | 5/2008 |
| EP | 1631109 A1 | 3/2006 |
| EP | 1865627 A1 | 12/2007 |
| EP | 1890402 A2 | 2/2008 |
| EP | 1890446 A2 | 2/2008 |
| EP | 1919100 A2 | 5/2008 |
| EP | 1976165 A2 | 10/2008 |
| JP | 2007515843 A | 6/2007 |
| WO | 2004102891 A1 | 11/2004 |
| WO | 2006088105 A1 | 8/2006 |
| WO | WO 2006121381 | 11/2006 |
| WO | WO 2007053954 A1 | 5/2007 |
| WO | WO 2008015507 A2 | 2/2008 |

OTHER PUBLICATIONS

Herhold, et al: "Cooperative Multi-Hop Transmission in Wireless Networks," Computer Networks, vol. 49, No. 3, Oct. 19, 2005, pp. 299-324, Elsevier Science Publishers BV, Amsterdam, NL, ISSN: 1389-1286.

International Search Report—PCT/US2008/087052—International Search Authority, European Patent Office, Dec. 28, 2009.

International Search Report—PCT/US2008/088331—International Search Authority, European Patent Office, Jun. 14, 2010.

Jiwei Chen et al: "TCP with Delayed Ack for Wireless Networks" International Conference on Broadband Communications, Networks and Systems, Oct. 1, 2006 (Oct. 1, 2006), pp. 1-10, XP031155956 IEEE, PI ISBN: 978-1-4244-0424-7 figures 1,4 sections I, I I , I I I . A , I I I .B.

Kyasanur P et al: "On the efficacy of separating control and data into different frequency bands" International Conference on Broadband Networks, Oct. 3, 2005 (Oct. 3, 2005), pp. 646-655, XP010890274 Piscataway, NJ, USA, IEEE DOI: 10.1109/ICBN.2005.1589665 ISBN: 978-0-7803-9276-2 abstract; figure 4 sections II.A, I I . B . 2 ), I I I , IV.A.3), IV.B, VI.

Partial International Search Report—PCT/US08/088331—International Search Authority EPO—Apr. 23, 2010.

Sadeghi, et al: "Snapshot Capacity of Multi Hop Ad Hoc Networks," IEEE Intl Conference on Communications, Jun. 1, 2006, pp. 1555-1561, ISBN: 978-1-4244-0354-7, sections I, IV.A, IV.C.

Vijaynarayanan Subramanian et al: "Disruption-Tolerant Link-level Mechanisms for Extreme Wireless Network Environments" International Conference on Communication Systems Software and Middleware, Jan. 1, 2007 (Jan. 1, 2007), pp. 1-10, XP031113865 IEEE, PI ISBN: 978-1-4244-0613-5 figures 3, 4(b) sections II.B, IV.B.

Wanqing Tu et al: "Resource-aware video multicasting via access gateways in wireless mesh networks" IEEE International Conference on Network Protocols, Oct. 19, 2008 (Oct. 19, 2008), pp. 43-52, XP031368949 IEEE, Piscataway, NJ, USA ISBN: 978-1-4244-2506-8 abstract; figures 1,3,5 sections I , I I I , IV.A, IV.D, IV.E, V.

Xin Liu et al: "An information-theoretic view of connectivity in wireless sensor networks" IEEE Communications Society Conference on Sensor and Ad Hoc Communications and Networks, Oct. 4, 2004 (Oct. 4, 2004), pp. 508-516, XP010759628 Piscataway, NJ, USA, IEEE DOI: 10.1109/SAHCN.2004.1381953 ISBN: 978-0/7803-8796-6 figure 1 sections I.A, II.

Zigui Yang, Anders H0st-Madsen: "Minimum Outage Probability Routing and Power Allocation in Wireless Ad-hoc Networks" IEEE International Conference on Wireless Networks, Communications and Mobile Computing, vol. 2, Jun. 13, 2005 (Jun. 13, 2005), pp. 1325-1330, XP010888152 Piscataway, NJ, USA, IEEE DOI: 10.1109/Wirles.2005.1549604 ISBN: 978-0-7803-9305-9 abstract; figures 1,2 sections I , I I, I I I, V.

Gurewitz O et al., "Cooperative Strategies and Achievable Rate for Tree Networks with Optimal Spatial Reuse ", IEEE Transactions on Information Theory, U.S.A., IEEE, Oct. 2007, vol. 53, Issue.10, pp. 3596-3614.

Taiwan Search Report—TW097150271—TIPO—Jun. 18, 2012.

Written Opinion—PCT/US2008/087052, International Search Authority, European Patent Office, Dec. 28, 2009.

Yang S et al., "Network Coding over a Noisy Relay : a Belief Propagation Approach",IEEE International Symposium on Information Theory, 2007. ISIT 2007.,U.S.A.,IEEE,Jun. 24, 2007,pp. 801-804.

\* cited by examiner

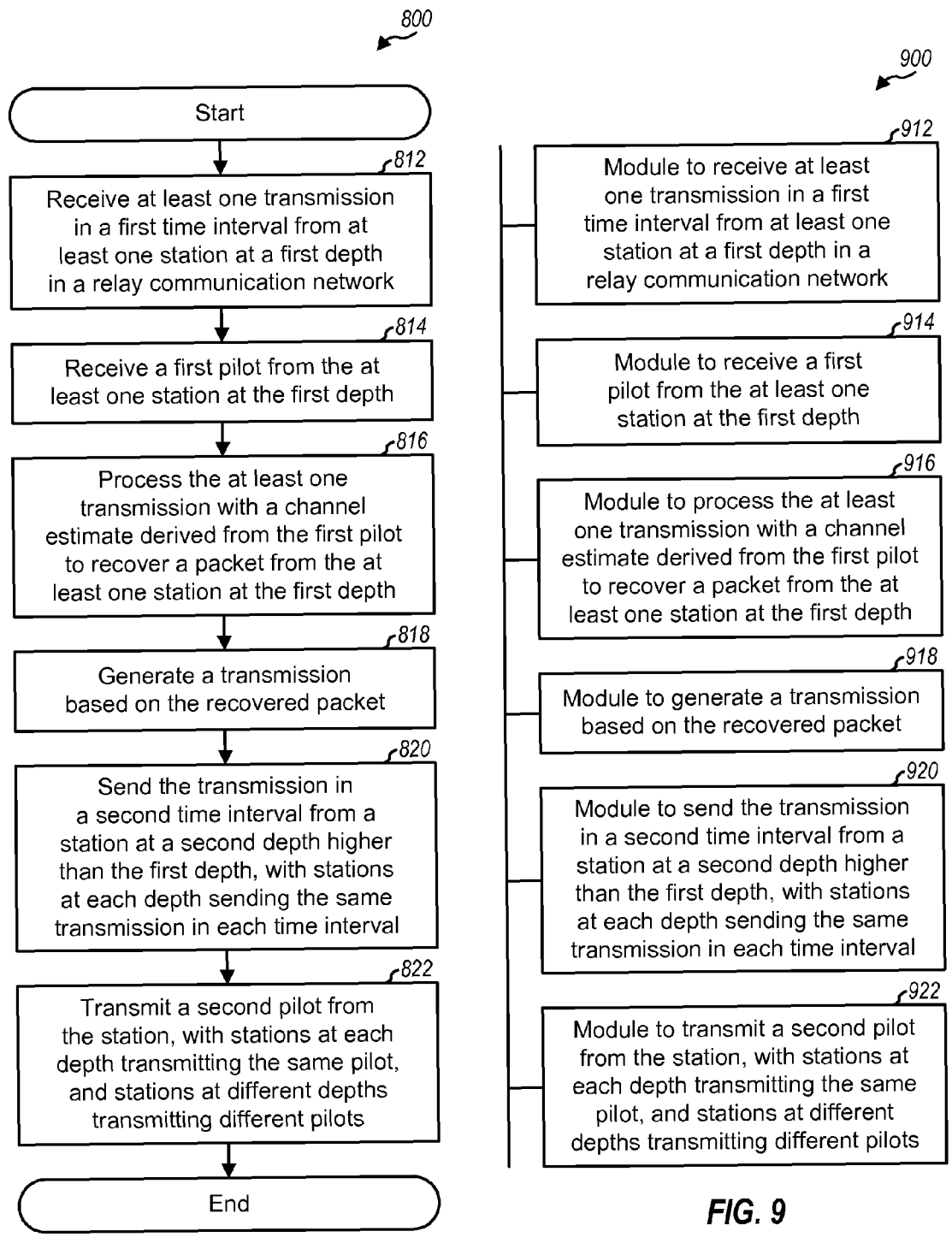

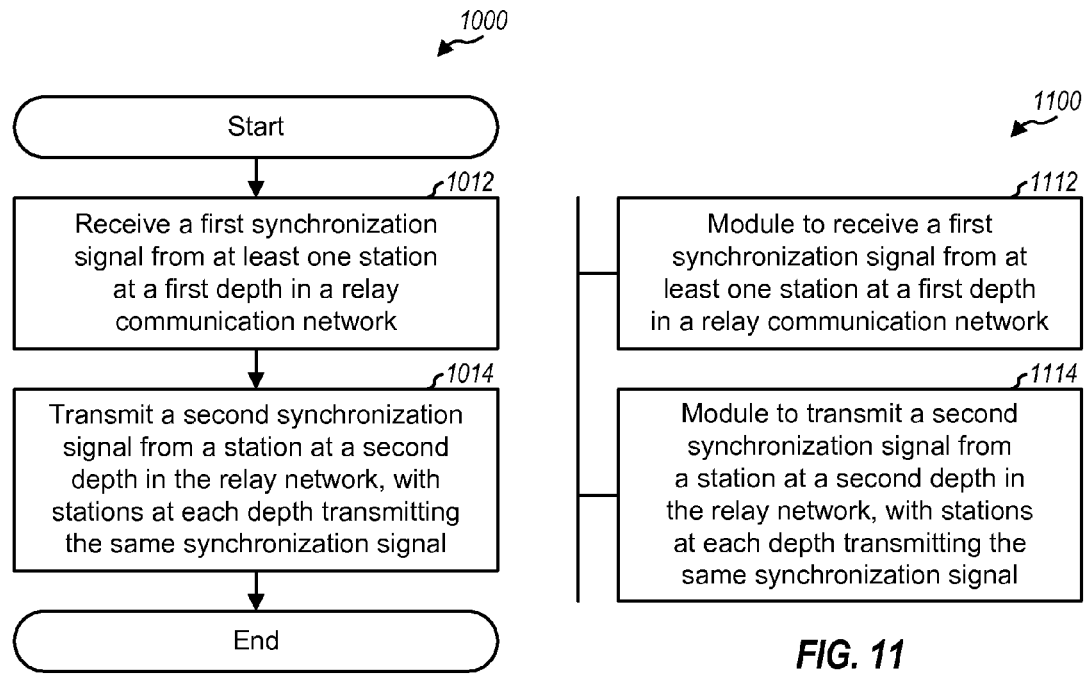
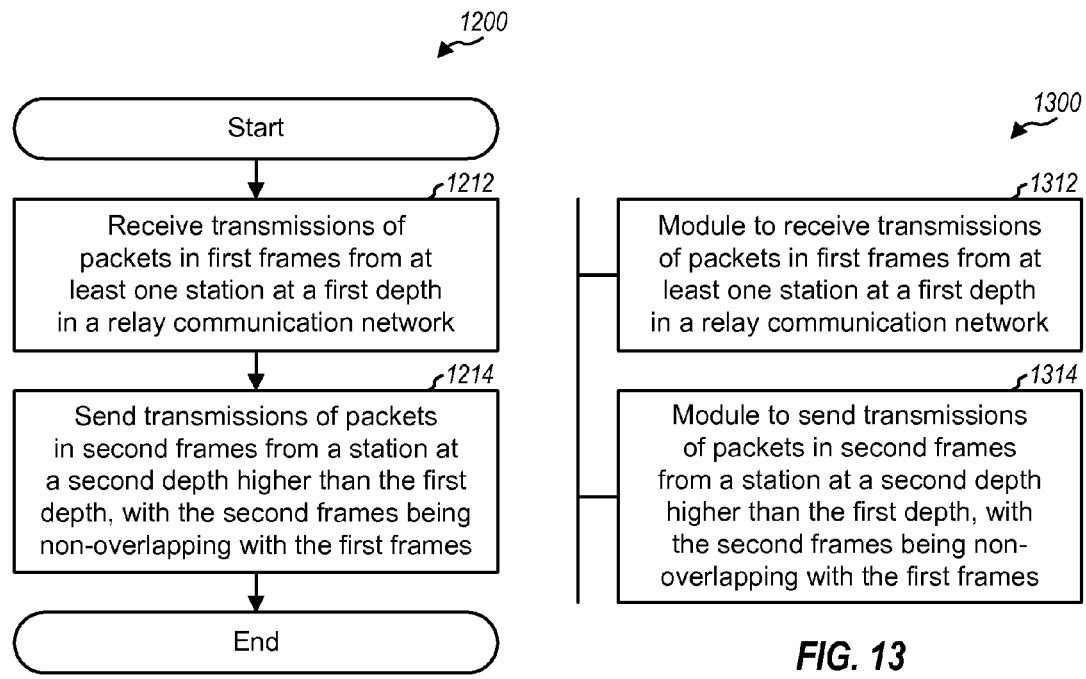

METHOD AND APPARATUS FOR COMMUNICATING IN A RELAY COMMUNICATION NETWORK

CROSS-REFERENCE TO RELATED APPLICATIONS

This application is related to concurrently filed and commonly owned U.S. patent application Ser. No. 12/257,258, entitled "DATA RECEPTION WITH INTERFERENCE CANCELLATION IN A RELAY COMMUNICATION NETWORK," and filed Oct. 23, 2008, now U.S. Pat. No. 8,634,769, the disclosure of which is hereby incorporated by reference herein.

BACKGROUND

I. Field

The present disclosure relates generally to communication, and more specifically to techniques for transmitting and receiving data in a wireless communication network.

II. Background

A wireless communication network may include a number of stations that can transmit and receive data. The coverage of a given station may be smaller than a desired coverage area. The small coverage may be due to various reasons such as low maximum transmit power, spectral mask constraints, high frequency spectrum, etc.

A large number of stations may be used to cover a given geographic area. These stations should be able to communicate with one other over the air since interconnecting many stations via a backhaul network may be expensive. The stations may be operated as unplanned repeaters that can "amplify and forward" transmissions. However, the unplanned repeaters may result in positive feedback loops and may also amplify noise. The stations may also be operated as incremental redundancy (IR) stations that can "decode and forward" transmissions in an uncoordinated manner. However, the IR stations may require carrier sensing and/or route planning in order to minimize collisions and manage interference. The IR stations may thus be highly inefficient if there is a large number of stations. Techniques for effectively transmitting and receiving data over a large geographic area are desirable.

SUMMARY

Techniques for transmitting and receiving data in a relay communication network are described herein. In an aspect, stations in the relay network may be grouped into multiple depths, and stations at each depth may send the same transmission in each time interval. The multiple depths may be denoted as depth 0 through depth D, where depth 0 is the lowest depth, depth D is the highest depth, and D may be any integer value. Stations at depth d may be able to successfully decode transmissions from stations at depth d−1 but not transmissions from stations at depth d−2 or lower. Packets may be transmitted in a pipelined manner in the relay network. Stations at progressively higher depth may send transmissions of a packet in successive time intervals.

In another aspect, stations at each depth may transmit the same synchronization signal, and stations at different depths may transmit different synchronization signals. In one design, the synchronization signals for different depths may comprise different pilots, which may be generated with different scrambling codes or different orthogonal codes or may be multiplexed in frequency and/or time. The synchronization signal for each depth may be used to identify stations at that depth, to determine the depth of the stations, to obtain timing information, to derive a channel estimate for the stations, etc.

In one design, a station may receive at least one transmission in a first time interval from at least one station at a first depth in the relay network. The station may also receive a first synchronization signal from the at least one station at the first depth. The station may be at a second depth higher than the first depth. The station may send a transmission in a second time interval after the first time interval and may also transmit a second synchronization signal. The station may perform auto-configuration, attempt to decode transmissions from stations at different depths, and determine its depth based on decoding results.

In yet another aspect, stations in the relay network may transmit data with half-duplex operation. A station may be able to only transmit or receive data at any given moment with half-duplex operation. In one design, stations at even depths may receive transmissions of packets in first frames (e.g., even-numbered frames) and may send transmissions of packets in second frames (e.g., odd-numbered frames). Stations at odd depths may receive transmissions of packets in the second frames and may send transmissions of packets in the first frames. A station at the lowest depth 0 may send transmissions in both the first and second frames. A station at the highest depth D may receive transmissions in both the first and second frames.

Various aspects and features of the disclosure are described in further detail below.

BRIEF DESCRIPTION OF THE DRAWINGS

FIGS. 8 and 9 show a process and an apparatus, respectively, for transmitting data in the relay network.
FIGS. 10 and 11 show a process and an apparatus, respectively, for sending synchronization signals in the relay network.
FIGS. 12 and 13 show a process and an apparatus, respectively, for transmitting data with half-duplex operation.

DETAILED DESCRIPTION

The techniques described herein may be used for a relay communication network having any number of stations. The terms "network" and "system" are often used interchangeably. The relay network may utilize Code Division Multiple Access (CDMA), Time Division Multiple Access (TDMA), Frequency Division Multiple Access (FDMA), Orthogonal FDMA (OFDMA), Single-Carrier FDMA (SC-FDMA), etc. The relay network may also implement a radio technology such as (i) Universal Terrestrial Radio Access (UTRA) or cdma2000 for CDMA, (ii) Global System for Mobile Communications (GSM) for TDMA, (iii) Evolved UTRA (E-UTRA), Long Term Evolution (LTE), Ultra Mobile Broadband (UMB), or Flash-OFDM® for OFDMA, (iv) IEEE 802.11 or Hiperlan for wireless local area network (WLAN), (v) IEEE 802.16 for wireless metropolitan area network (WMAN), etc. The techniques may also be used with other multiple access schemes and/or other radio technologies. The techniques may be used for communication networks supporting unicast transmission to specific stations, multicast transmission to groups of stations, and/or broadcast transmission to all stations.

Figure 1:
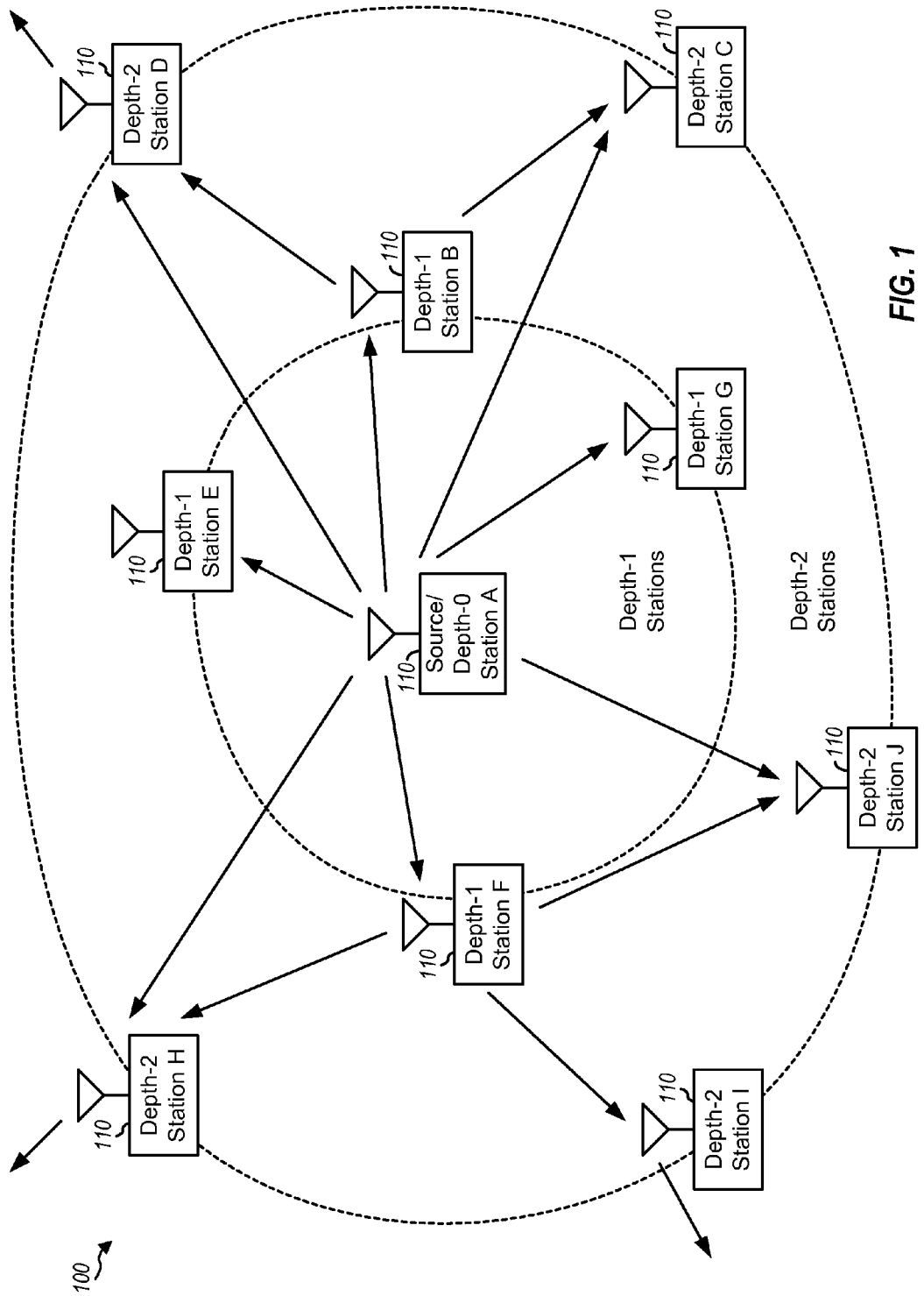
FIG. 1 shows a relay communication network.

FIG. 1 shows a relay communication network 100, which may also be referred to as a peer-to-peer network, a broadcast network, a distributed broadcast network, a mesh network, etc. Relay network 100 may include any number of stations 110, which may also be referred to as nodes. A station may be a base station, a terminal, etc. A base station may be a fixed station that communicates with the terminals and may also be referred to as an access point, a Node B, an evolved Node B (eNB), etc. A terminal may be stationary or mobile and may also be referred to as an access terminal, a mobile station, a user equipment, a subscriber unit, a station, etc. A terminal may be a cellular phone, a personal digital assistant (PDA), a wireless modem, a wireless communication device, a handheld device, a laptop computer, a cordless phone, a wireless local loop (WLL) station, etc. A terminal may communicate with a base station and/or peer-to-peer with other terminals.

In relay network 100, a station may be a source station, a relay station, or a destination station. A source station is a station that originates a transmission of data. A relay station is a station that receives a transmission from one or more upstream stations and resends the transmission to one or more downstream stations. A destination station is a station that receives a transmission from one or more other stations and does not resend the transmission. An upstream station is a station from which a transmission is received, and a downstream station is a station to which a transmission is sent.

In one design, the stations in the relay network may be grouped based on depth. Depth may also be referred to as tier, level, etc. The grouping may be done in a distributed and ad-hoc manner, without the need for pre-planning. Source stations are at the lowest depth 0 and are referred to as depth-0 stations or nodes. Stations that can correctly decode transmissions from source stations are at depth 1 and are referred to as depth-1 stations. In general, stations that can correctly decode transmissions from depth-d stations are at depth d+1 and are referred to as depth-(d+1) stations, for d≥0. In the example shown in FIG. 1, station A is a source/depth-0 station, stations B, E, F and G are depth-1 stations, and stations C, D, H, I and J are depth-2 stations. In general, the relay network may include depths 0 through D, with depth 0 being the lowest depth, depth D being the highest depth, and D being an integer value.

In an aspect, the relay network may support transmission of packets in a pipelined manner. A packet may be transmitted by stations at different depths in successive time intervals. Furthermore, all stations at the same depth may transmit the packet at the same time.

Figure 2:
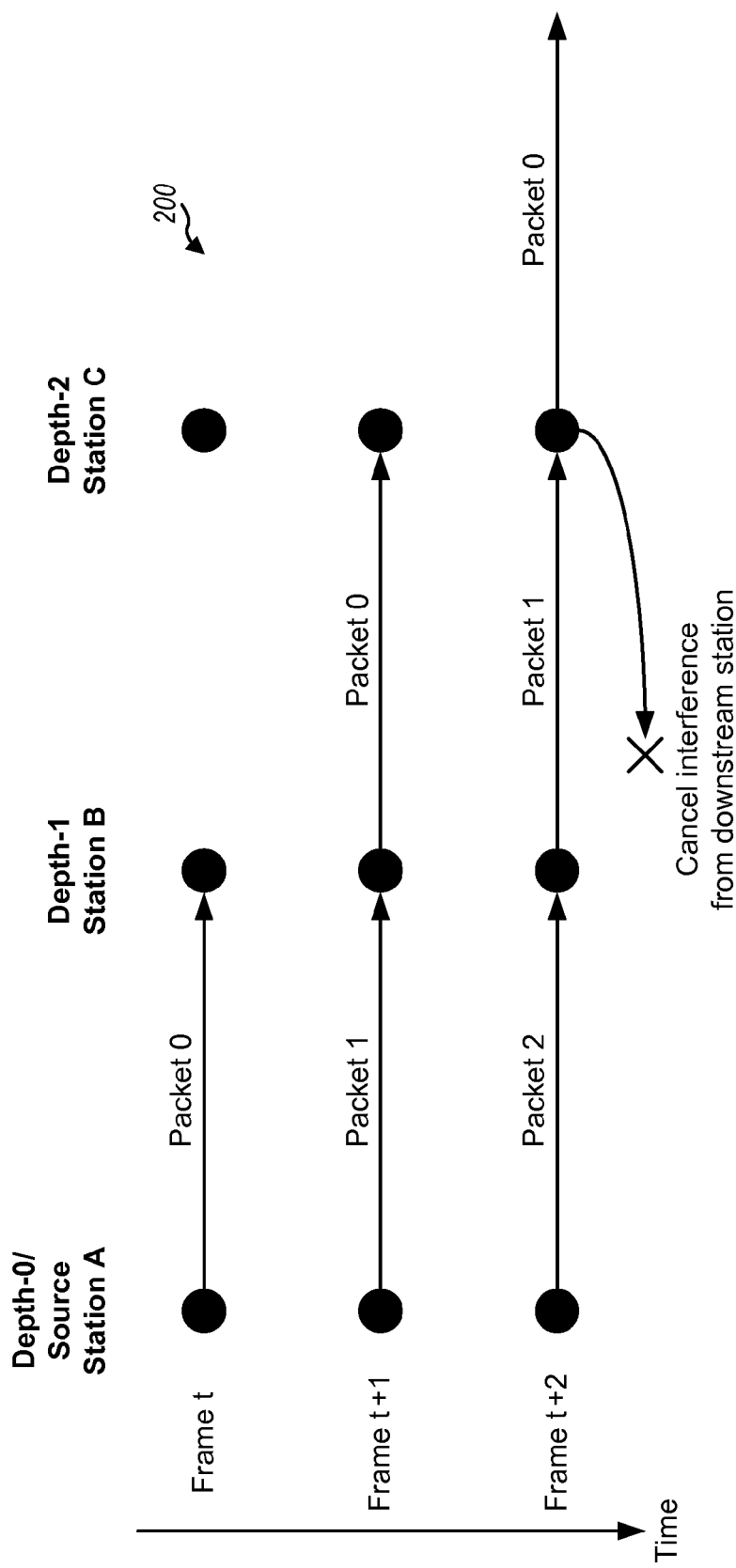
FIG. 2 shows a transmission scheme for the relay network.

FIG. 2 shows a design of a transmission scheme 200 for the relay network. The transmission timeline may be partitioned into units of frames. A frame is a unit of time and may have a predetermined time duration, e.g., 1 millisecond (ms), etc. A frame may also be referred to as a time interval, a transmission time interval, a slot, a subframe, etc. In the example shown in FIG. 2, station A is a source/depth-0 station, station B is a depth-1 station within range of station A, and station C is a depth-2 station within range of station B.

In frame t, station A transmits packet 0, which is received and decoded by station B. In frame t+1, station A transmits packet 1, which is received and decoded by station B. Station B also transmits packet 0, which is received and decoded by station C. In frame t+2, station A transmits packet 2, which is received and decoded by station B. Station B also transmits packet 1, which is received and decoded by station C. Station C also transmits packet 0 to downstream stations at the next higher depth.

Packet transmission may occur in similar manner in each subsequent frame. In each frame, a station at depth d may receive and decode a packet from upstream stations at depth d−1 and may transmit a prior decoded packet to downstream stations at depth d+1 (if any).

As shown in FIG. 2, a given packet is transmitted by stations at progressively higher depths in consecutive frames. For example, packet 0 is transmitted by station A in frame t, then transmitted by station B in frame t+1, and then transmitted by station C in frame t+2. Station A at the lowest depth 0 may transmit a new packet in each frame. Station B at the next higher depth 1 may receive a packet from station A in each frame and may also transmit the packet received in the prior frame (if any) to station C at the next higher depth 2. In each frame, each station may receive a packet from upstream stations and may transmit a prior received packet to downstream stations.

In one design, all stations at a given depth d may send transmissions having the same waveform. The terms "transmission" and "signal" may be used interchangeably. Depth-d stations may send their transmissions in the same frame. A station at the next higher depth d+1 may receive transmissions from one or more depth-d stations. Since the transmissions have the same waveform, the depth-(d+1) station may treat the transmissions from different depth-d stations in the same manner as transmissions received via different propagation paths in a multipath channel. The depth-(d+1) station may process the transmissions received from all depth-d stations to recover a packet sent by the depth-d stations. The coverage achieved by the relay network may be equal to that of a single frequency network (SFN) with all upstream stations transmitting the same waveform.

A station may generate a transmission of a packet using orthogonal frequency division multiplexing (OFDM), single-carrier frequency division multiplexing (SC-FDM), or some other modulation technique. An OFDM symbol may be generated by (i) performing a K-point inverse fast Fourier transform (IFFT) on K symbols mapped to K subcarriers to obtain a useful portion containing K time-domain samples and (ii) copying the last C samples and appending these C samples to the front of the useful portion to obtain an OFDM symbol containing K+C samples. An SC-FDM symbol may be generated by (i) performing an M-point discrete Fourier transform (DFT) on M time-domain symbols to obtain M frequency-domain symbols, (ii) mapping the frequency-domain symbols and zero symbols to the K subcarriers, (iii) performing a K-point IFFT on the K mapped symbols to obtain a useful portion containing K time-domain samples, and (iv) appending a cyclic prefix of C samples to the front of the useful portion to obtain an SC-FDM symbol containing K+C samples. For both OFDM and SC-FDM, a receiving station may obtain a received OFDM or SC-FDM symbol containing transmissions from one or more stations and can effectively handle multipath by simply discarding the cyclic prefix. Other multiplexing schemes besides OFDM and SC-FDM may also be used by the relay network.

In an aspect, a relay station may decode transmissions received from upstream stations with interference cancellation (IC) for downstream stations. Transmissions sent by the downstream stations may act as interference to the transmissions from the upstream stations and may degrade received signal quality at the relay station. The relay station has knowledge of the transmissions sent by the downstream stations and can thus estimate and cancel the interference due to these transmissions.

Figure 3:
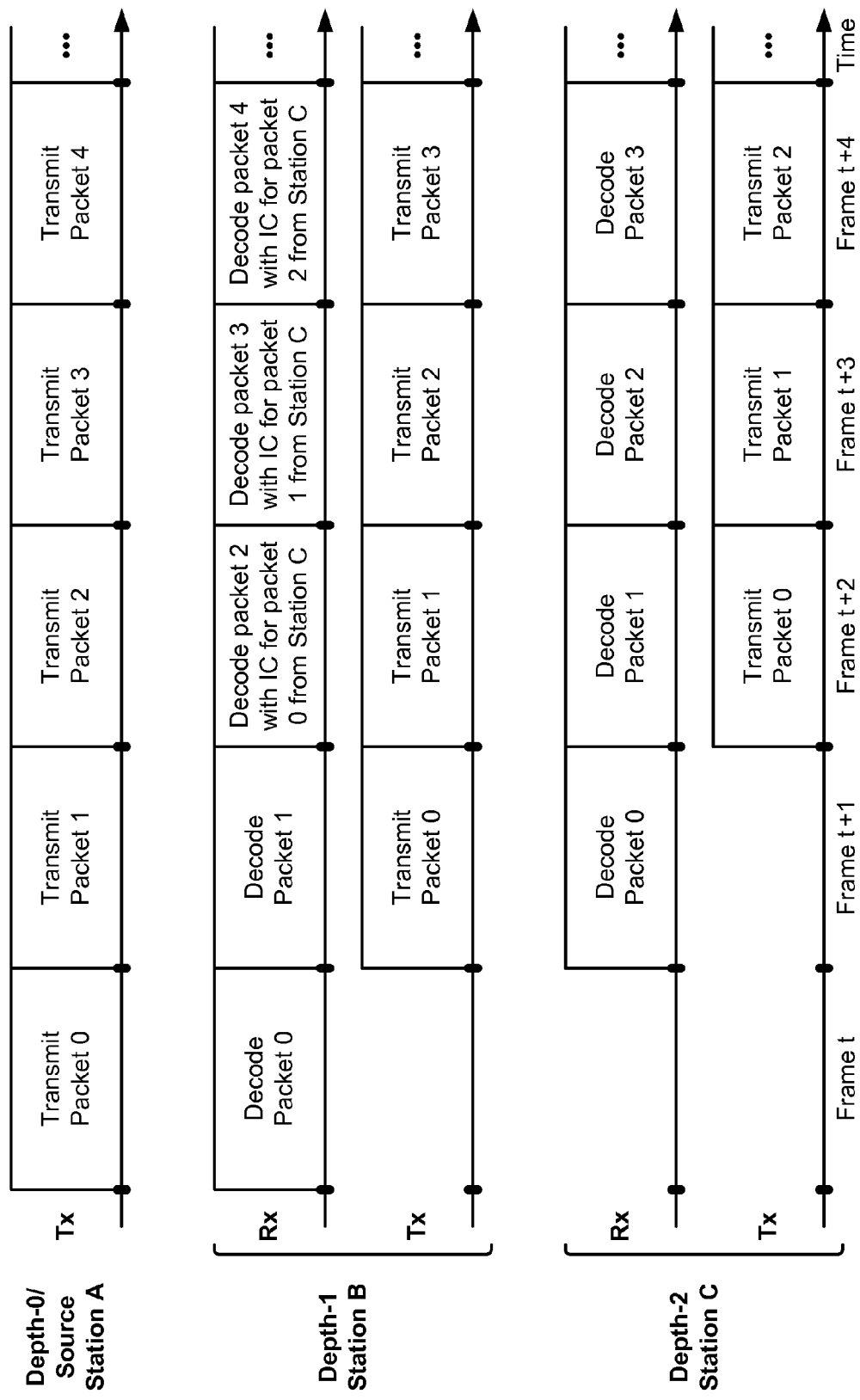
FIG. 3 shows packet decoding with interference cancellation.

FIG. 3 shows a design of packet decoding with interference cancellation for downstream stations. In this example, packet 0 is transmitted by station A in frame t, decoded by station B and retransmitted in frame t+1, and decoded by station C and retransmitted in frame t+2. The next packet 1 is transmitted by station A in frame t+1, decoded by station B and retransmitted in frame t+2, and decoded by station C and retransmitted in frame t+3.

The next packet 2 is transmitted by station A in frame t+2. Station B receives packet 2 from station A as well as packet 0 from station C in frame t+2. Station B may estimate the interference due to packet 0 transmitted by station C. Station B may then subtract the estimated interference from its received signal to obtain an interference canceled signal. Station B may then process the interference canceled signal to recover packet 2 transmitted by station A in frame t+2. Station B may decode each subsequent packet transmitted by station A with interference cancellation for a packet transmitted by station C.

Interference cancellation for a given packet X may be performed in various manners. In one design, a depth–d station may generate a transmission of packet X after correctly decoding the packet. The depth–d station may also estimate the channel response for one or more depth–(d+1) stations based on pilots received from the depth–(d+1) stations. The depth–d station may then pass the transmission of packet X through the estimated channel response to obtain the estimated interference for the depth–(d+1) stations. The depth–d station may then subtract the estimated interference from the received signal.

In another aspect, a station at depth d may use transmissions from upstream stations at different depths to recover a packet. The depth–d station may receive transmissions of the packet from stations at depths 0 through d–1 in d consecutive frames. The depth–d station may collect information for the packet in each frame based on a received signal for that frame. The depth–d station may then perform decoding based on all collected information for the packet, which may improve decoding performance.

In one design, the collected information may be given in the form of log likelihood ratios (LLRs) for code bits of the packet. An LLR for a given code bit may be defined as a ratio of the probability of the code bit being '1' to the probability of the code bit being '0'. LLRs may be computed in a manner known in the art based on available information such as a received signal, a channel estimate, an interference estimate, etc. In general, the quality of the LLRs improves with less noise and interference, which may improve decoding performance.

Figure 4:
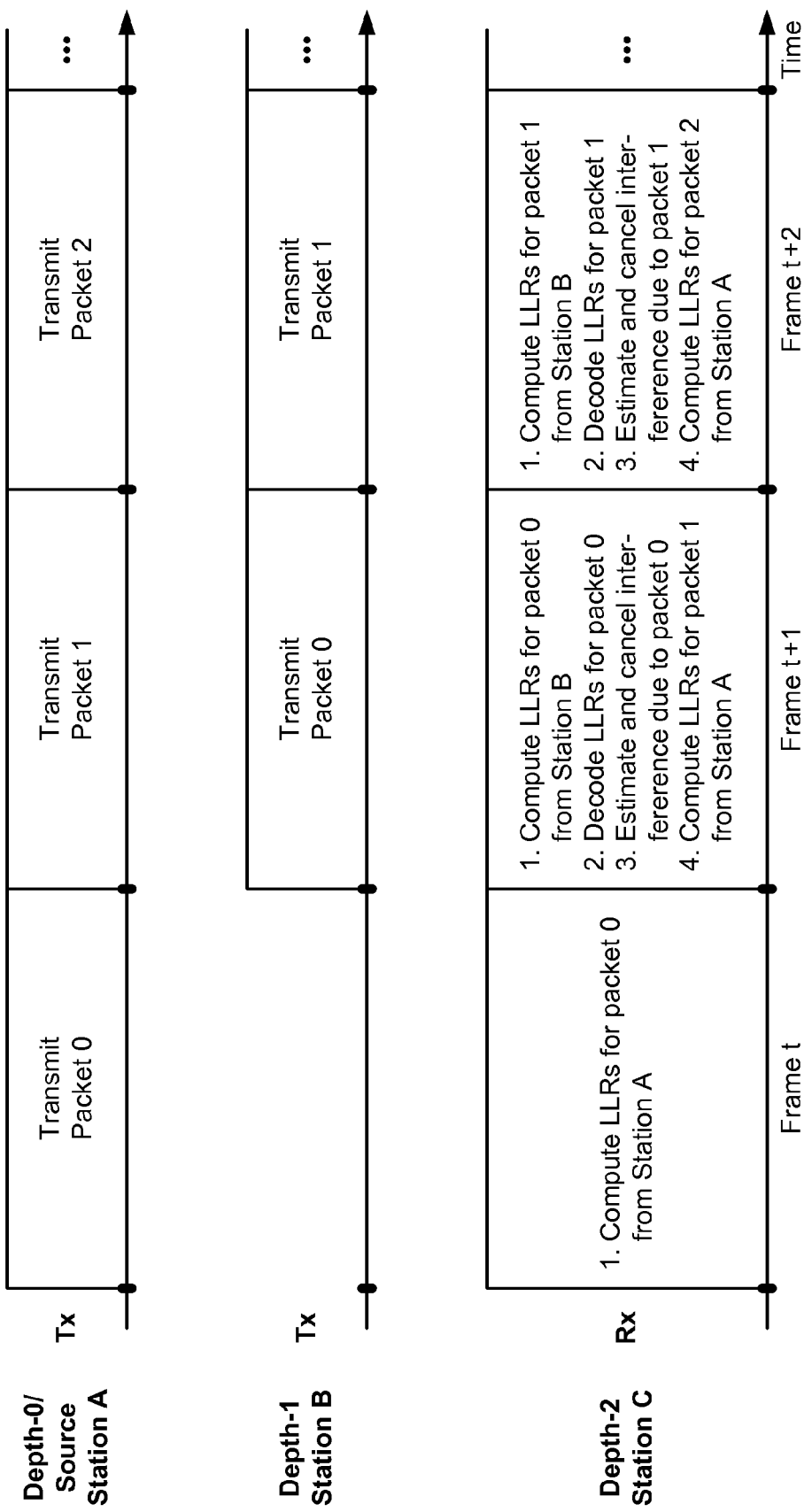
FIG. 4 shows packet decoding using transmissions from stations at different depths.

FIG. 4 shows a design of packet decoding using transmissions from upstream stations at different depths. In this example, in frame t, station A sends a transmission of packet 0, which is received and decoded by station B. Station C also receives the transmission of packet 0 from station A and computes LLRs for packet 0 based on its received signal. Station C may attempt to decode the LLRs to recover packet 0 or may simply store these LLRs.

In frame t+1, station A sends a transmission of packet 1, and station B sends a transmission of packet 0. Station C receives the transmission of packet 1 from station A as well as the transmission of packet 0 from station B. Station C computes LLRs for packet 0 based on its received signal. Station C then decodes the LLRs obtained in frames t and t+1 to recover packet 0. Station C may also compute LLRs for packet 1 based on its received signal and may store these LLRs (not shown in FIG. 4). Station C may compute and decode LLRs for subsequent packets in similar manner.

FIG. 4 also shows a design of LLR computation with interference cancellation. Station C receives the transmission of packet 1 from station A as well as the transmission of packet 0 from station B in frame t+1. These transmissions interfere with one another at station C. Station C may decode the LLRs obtained in frames t and t+1 to recover packet 0. In one design, station C may then estimate the interference due to the transmission of packet 0 from station B in frame t+1, e.g., by generating the transmission of packet 0 after correctly decoding the packet and passing the transmission through the estimated channel response for station B to obtain the estimated interference. Station C may then subtract the estimated interference from its received signal in frame t+1 to obtain an interference canceled signal. Station C may then compute the LLRs for packet 1 based on the interference canceled signal (instead of the received signal) in frame t+1.

As shown in FIGS. 2 to 4, packets may be transmitted in a pipelined manner, with each station transmitting a packet only once. A relay station may decode transmissions received from upstream stations with interference cancellation of transmissions sent by downstream stations, as shown in FIG. 3. A station may also perform decoding based on LLRs obtained for upstream stations at one or more depths and may also perform interference cancellation prior to computing LLRs, as shown in FIG. 4. The effectiveness of pipelined transmissions is dependent on correct decoding of packets by each relay station, so that the station can send correct transmissions of packets to downstream stations. The effectiveness of interference cancellation is also dependent on correct decoding of packets by each station, so that the station can estimate and cancel the interference due to the decoded packets. If a given station decodes a packet in error, then the station may send an erroneous transmission of the packet. In this case, downstream stations may not be able to correctly decode the packet. If interference cancellation is relied on for packet decoding, then the pipeline may break once a packet is decoded in error. This is because interference cancellation may be ineffective with the packet decoded in error, and the next packet may also be decoded in error with higher interference due to ineffective interference cancellation.

In an aspect, boot-up packets may be sent periodically to re-initialize the pipeline and limit propagation of errors. A boot-up packet is a packet sent by only the source station in a designated frame, with stations at higher depths not transmitting during the designated frame. A boot-up packet may be sent at the start of each superframe. A superframe may include T frames with indices of 0 through T−1, where T may be any suitable value. In one design, in each superframe, only stations at depth d or higher can transmit packets in frame d, for 0≤d<T. This design may allow downstream stations to correctly decode packets and perform interference cancellation.

Figure 5:
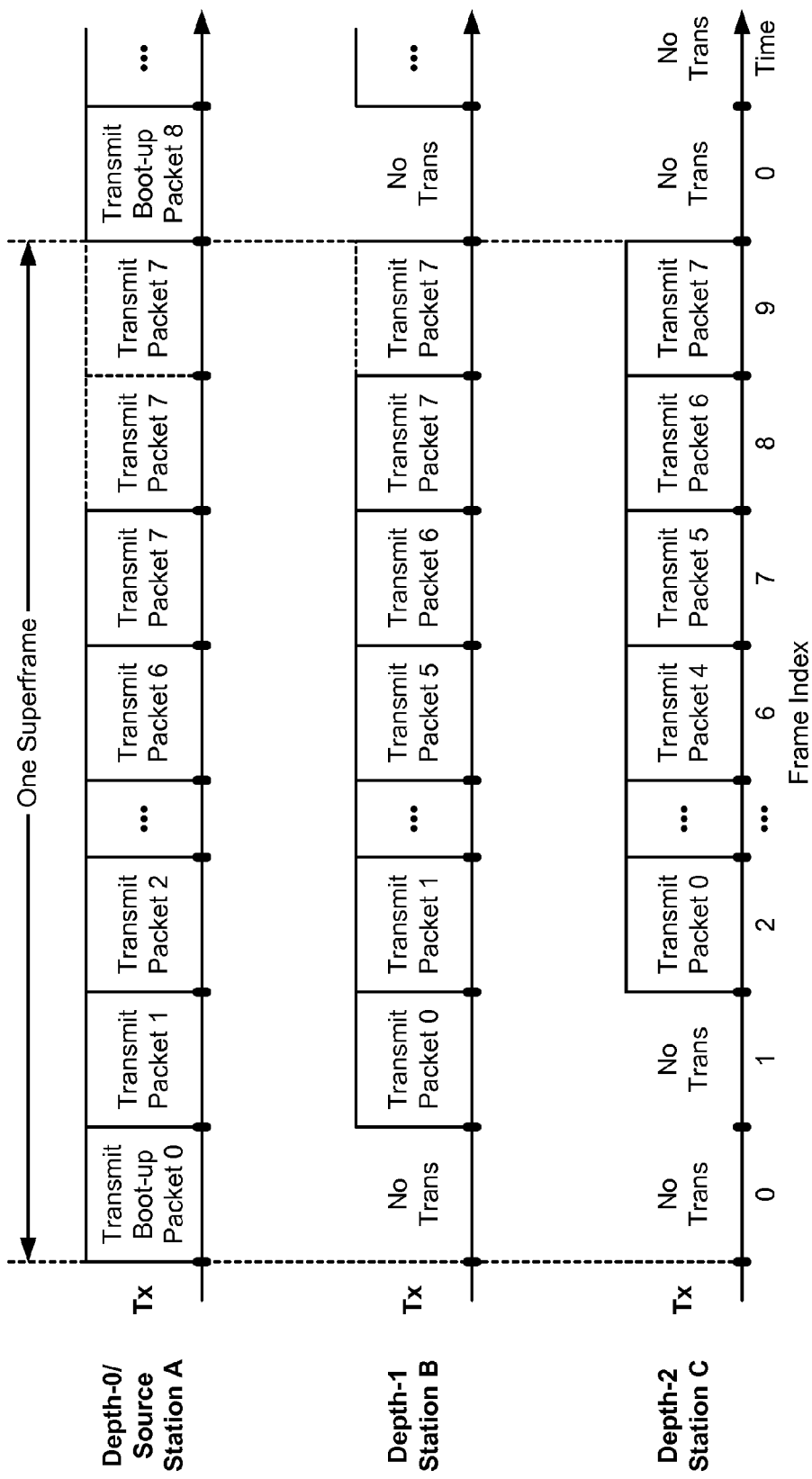
FIG. 5 shows a transmission scheme with periodic boot-up packets.

FIG. 5 shows a design of a transmission scheme with periodic boot-up packets. In this example, station A is a source station, station B is a depth–1 station, station C is a depth–2 station, and the highest depth is D=2. A superframe includes T=10 frames with indices 0 through 9.

In frame 0, only station A transmits packet 0, and all other stations at higher depths are silent. Packet 0 is a boot-up packet for the superframe. In frame 1, station A transmits packet 1, station B transmits packet 0, and station C is silent. In frame 2, station A transmits packet 2, station B transmits packet 1, and station C transmits packet 0. Stations A, B and C all transmit packets in each of frames 3 through 6. In frame 7, station A transmits the last packet 7 in the superframe, and stations B and C transmit packets 6 and 5, respectively. In frame 8, station B transmits the last packet 7, and station C transmits packet 6. Station A may be silent (not shown in FIG. 5) or may act as a depth–1 station and transmit packet 7 (as shown in FIG. 5). In the last frame 9, station C transmits the last packet 7. Stations A and B may be silent (not shown in FIG. 5) or may act as depth–2 stations and transmit packet 7 (as shown in FIG. 5).

Packet transmission in the next superframe occurs in similar manner. In frame 0 of the next superframe, only station A transmits the next packet 8, which is a boot-up packet for this superframe, and all other stations at higher depths are silent. Packet transmission continues in each subsequent frame as described above.

As shown in FIG. 5, the boot-up packets may allow the decoding and interference cancellation pipeline to start properly. Since only source station A transmits packet 0 in the first frame 0 of a superframe, depth–1 station B can correctly decode packet 0 without interference from other stations. In frame 2, station B may receive interference due to packet 0 from depth–2 station C. Station B may estimate and cancel the interference due to packet 0 from station C prior to decoding packet 2 from source station A. If the interference cancellation is effective, then the received signal quality for packet 2 may be comparable to the received signal quality for packet 0 without any transmission from station C.

Furthermore, since only source station A transmits packet 0 in the first frame 0, depth–2 station C can compute LLRs for packet 0 without interference from other stations. In frame 1, station C receives both packet 0 from depth–1 station B and packet 1 from source station A and can compute LLRs for packet 0 with interference from station A. Station C may decode the LLRs obtained in both frames 0 and 1 to recover packet 0. Station C may then estimate the interference due to packet 0 from station B and may subtract the estimated interference from the received signal. Station C may then compute LLRs for packet 1 from station A based on the interference canceled signal. If the interference cancellation is effective, then the received signal quality for packet 1 in frame 1 may be comparable to the received signal quality for packet 0 in frame 0. The decoding and interference cancellation pipeline may thus start successfully with station B not transmitting in frame 0 and station C not transmitting in frames 0 and 1 of each superframe.

Overhead for the boot-up packets may be dependent on the superframe duration T and the maximum depth D in the relay network. A shorter superframe may reduce packet error propagation whereas a longer superframe may reduce overhead. The maximum depth D may be dependent on the desired coverage.

In the designs described above, interference cancellation may be performed based on full packet decoding. As shown in FIG. 3, a relay station (e.g., station B) may perform interference cancellation for packets transmitted by downstream stations (e.g., station C) based on packets that have been correctly decoded by the relay station. Furthermore, as shown in FIG. 4, a depth–d station (e.g., station C) may perform interference cancellation for packets that have been correctly decoded by that station prior to LLR computation for packets from depth–(d–2) stations (e.g., station A).

In another design, interference cancellation may be performed without decoding packets. Station B or C may use estimates of modulation symbols based on the received symbols or may use the LLRs after a few Turbo iterations. Station B or C may also use other techniques such as spatial nulling to help reduce interference. Most of the interference due to a packet may be correctly cancelled even without decoding the packet.

A station may support full-duplex or half-duplex operation. For full-duplex operation, the station can simultaneously transmit and receive data at the same time, as shown in FIGS. 3 to 5. For half-duplex operation, the station can only transmit or receive data at any given moment.

In an aspect, data transmission may be supported by having half-duplex stations at different depths transmit in different frames. In one design, stations at even depths (e.g., depth 0, 2, etc.) may transmit packets in even-numbered frames, and stations at odd depths (e.g., depth 1, 3, etc.) may transmit packets in odd-numbered frames. Depth-0 stations do not need to receive data and can thus transmit in both even-numbered and odd-numbered frames, which may improve performance.

Figure 6:
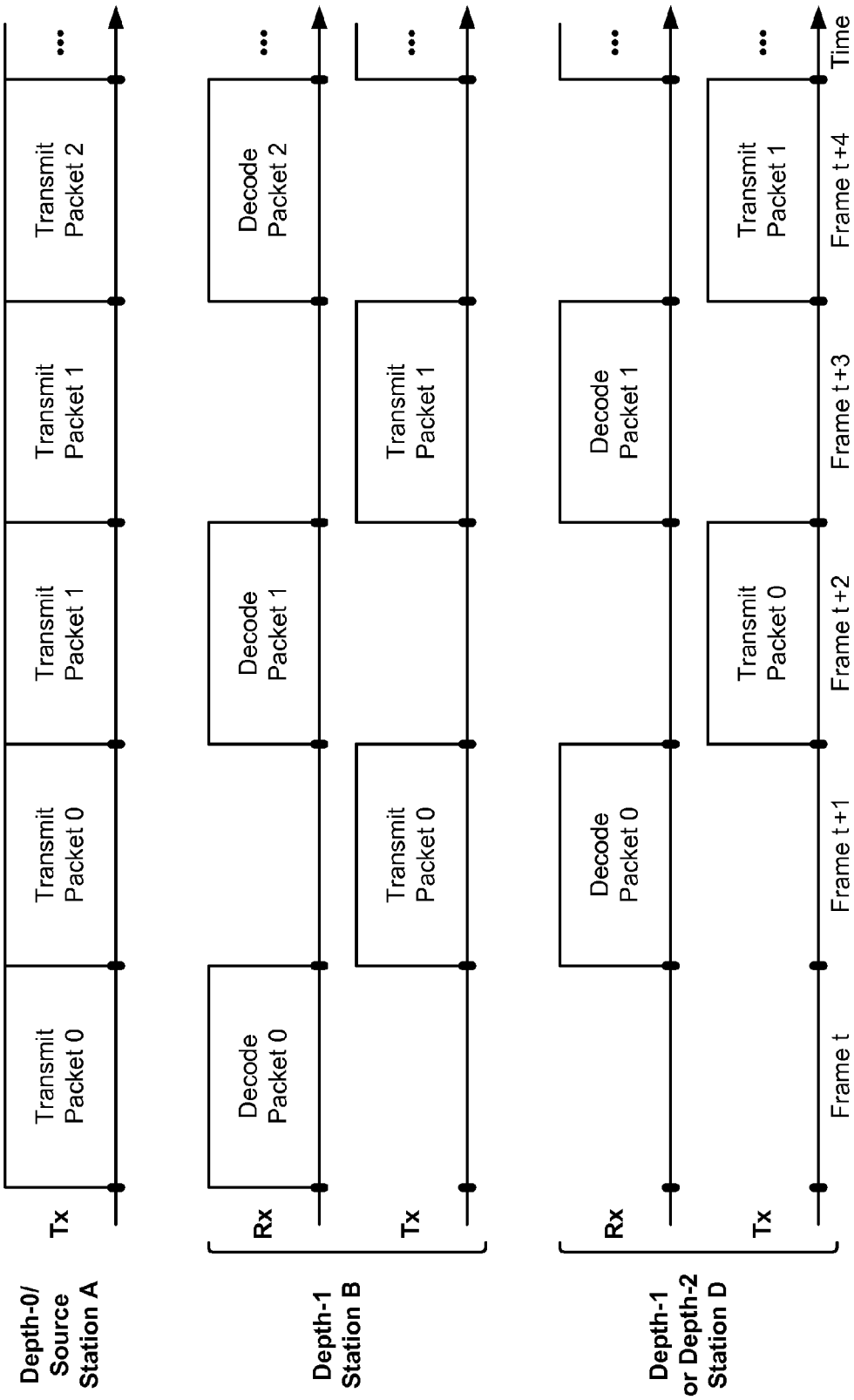
FIG. 6 shows a transmission scheme for half-duplex stations.

FIG. 6 shows a design of a transmission scheme for half-duplex stations. In this example, station A is a source station, station B is a depth–1 station, and station D may be a depth–1 or depth–2 station. Stations A, B and D support half-duplex operation.

In frame t, station A transmits packet 0, which is received and decoded by station B. In frame t+1, stations A and B both transmit packet 0, which is received and decoded by station D. In each odd-numbered frame, station A acts as a depth–1 station and transmits the same packet as station B. In frame t+2, station A transmits packet 1 and station D transmits packet 0. Station B performs interference cancellation for packet 0 and then decodes packet 1. In frame t+3, stations A and B both transmit packet 1, which is received and decoded by station D. In frame t+4, station A transmits packet 2 and station D transmits packet 1. Station B performs interference cancellation for packet 1 and then decodes packet 2. Packet transmission may occur in similar manner in each subsequent frame.

As shown in FIG. 6, station D may be a depth–2 station that can receive only during odd-numbered frames and may not be able to compute LLRs for packets transmitted by depth–0 station A during even-numbered frames. However, station A may transmit each packet in both an even-numbered frame as well as the following odd-numbered frame. In this case, station D can receive each packet from both stations A and B in the same frame. The decoding performance of station D with half-duplex operation in FIG. 6 may be comparable to the decoding performance of station C with full-duplex operation and interference cancellation in FIG. 4.

In one design, stations at a given depth may be partitioned into two sets. A first set of stations may transmit in first frames and receive in second frames. A second set of stations may transmit in the second frames and receive in the first frames. The first frames may be even-numbered frames, and the second frames may be odd-numbered frames, or vice versa. For example, stations B and D in FIG. 6 may both be depth–1 stations, with station B belonging in the first set, and station D belonging in the second set. The two sets of stations at the same depth may thus transmit and receive in different frames. This may allow destination stations to receive in both even-numbered and odd-numbered frames, which may improve performance.

In an aspect, stations at different depths may transmit different pilots, which may allow other stations to determine the depths of these stations. A pilot is known data that is processed in a known manner and may be used by a receiving station for various purposes such as channel estimation, time and/or frequency acquisition, signal strength measurement, station identification, etc. A pilot may also be referred to as a reference signal, a preamble, a training sequence, etc. In one design, code division multiplexing (CDM) may be used for the pilots. The stations at each depth may generate their pilots with a different scrambling code and/or a different orthogonal code assigned to that depth. The stations at different depths may transmit their pilots concurrently, e.g., in the same time and frequency block in order to reduce pilot overhead.

In another design, frequency division multiplexing (FDM) may be used for the pilots. The stations at different depths may transmit their pilots on different sets of subcarriers, and these pilots may be orthogonal to one another in the frequency domain. In yet another design, time division multiplexing (TDM) may be used for the pilots. The stations at different depths may transmit their pilots in different symbol periods, and these pilots may be orthogonal to one another in the time domain. In general, the pilots for stations at different depths may utilize any one or any combination of multiplexing schemes. The pilots may be transmitted in designated frames, in designated symbol periods of each frame or each designated frame, whenever packets are transmitted, and/or at some other times.

In another aspect, stations at different depths may transmit different synchronization signals. A synchronization signal may carry pertinent information such as depth information (e.g., the maximum allowed depth in the network), station identifier (ID), system bandwidth, FFT size, frame timing, superframe timing, data rate information, etc. Upon recovering the pertinent information from a synchronization signal, a receiving station may use the synchronization signal in the same manner as a pilot for various purposes described above. A synchronization signal may comprise a pilot and/or other signals, depending on the information to send in the synchronization signal. A station may transmit a synchronization signal and/or a pilot.

A station may derive a channel estimate for stations at a given depth based on the pilots and/or synchronization signals received from these stations. The station may also use part of a data portion transmitted by downstream stations to derive a channel estimate for these stations. The station may also perform iterative channel estimation prior to performing interference cancellation in order to improve performance. The station may also perform iterative channel estimation and interference cancellation in order to improve performance.

In an aspect, a station may perform auto-configuration and determine its depth without the need for manual configuration. The station may perform auto-configuration when the station is added to or moved within the relay network. The station may perform auto-configuration when the station is powered up, when the station decodes one or more packets in error, etc.

For auto-configuration, the station may receive pilots and/or synchronization signals from other stations and may determine the depths of the detected stations based on their pilots and/or synchronization signals. The station may attempt to decode packets from detected stations at the lowest depth. If the packet decoding is unsuccessful, then the station may attempt to decode packets from stations at the next higher depth. The station may attempt to decode packets from detected stations at progressively higher depth until the packets can be correctly decoded. The station may then determine its depth as one higher than the depth of the stations from which packets can be correctly decoded. Thus, if the station can correctly decode packets from depth-d stations but not from depth-(d−1) stations, then the station becomes a depth-(d+1) station.

The relay network described herein may support low power transmissions, higher carrier frequencies, and/or higher data rates. The performance of the relay network may be illustrated by the following example.

Figure 7:
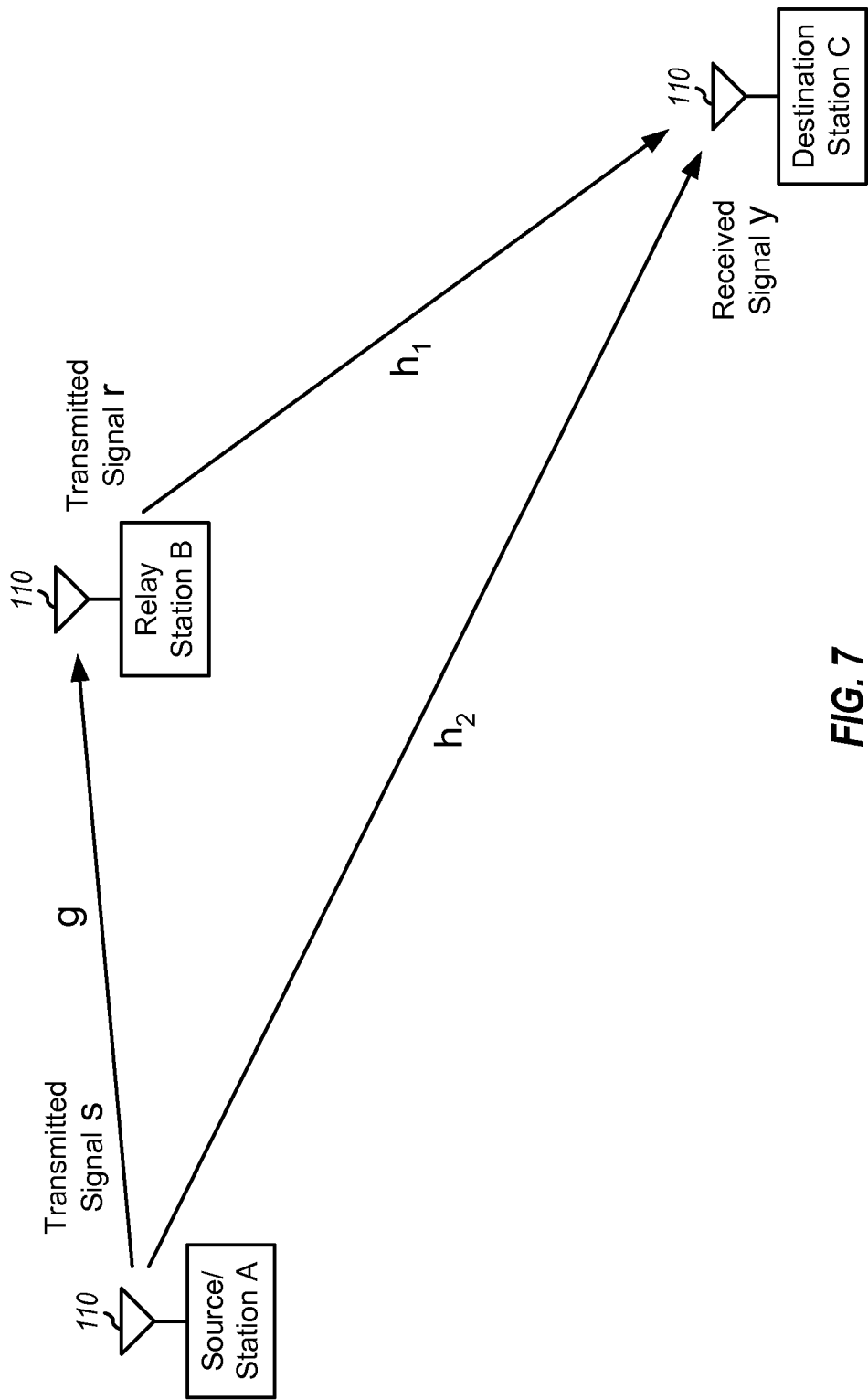
FIG. 7 shows packet transmissions by three stations.

FIG. 7 shows an example of packet transmissions for three stations in the relay network. In this example, station A is a source station, station B is a relay station, and station C is a destination station. Each station transmits at a power level of P, and the thermal noise at each station is $N_0$. The channel gain between stations A and B is g, the channel gain between stations B and C is $h_1$, and the channel gain between stations A and C is $h_2$. The capacity of each link (assuming other links are not active) may be expressed as:

$$C_{AB} = \log\left(1 + \frac{|g|^2 \cdot P}{N_0}\right), \quad \text{Eq (1)}$$

$$C_{BC} = \log\left(1 + \frac{|h_1|^2 \cdot P}{N_0}\right), \quad \text{Eq (2)}$$

$$C_{AC} = \log\left(1 + \frac{|h_2|^2 \cdot P}{N_0}\right), \quad \text{Eq (3)}$$

where $C_{AB}$ is the capacity of the link from station A to station B,
$C_{BC}$ is the capacity of the link from station B to station C, and
$C_{AC}$ is the capacity of the link from station A to station C.

An overall data rate R is a data rate at which station A can transmit data to stations B and C. The overall data rate R should be less than $C_{AB}$ in order for station B to correctly decode packets from station A. The overall data rate R should also be less than the capacity of the links to station C in order for station C to correctly decode packets from stations A and B.

A received signal at station C may be expressed as:

$$y = h_1 \cdot r + h_2 \cdot s + n, \quad \text{Eq (4)}$$

where r is a signal transmitted by station B,
s is a signal transmitted by station A,
y is the received signal at station C, and
n is the noise at station C.

In frame t, signal s may carry packet 0, and signal r may not be present. Station C may compute LLRs for packet 0 based on the received signal y, which may contain only signal s carrying packet 0 from station A. The amount of received mutual information $C_t$ in frame t may be expressed as:

$$C_t = \log\left(1 + \frac{|h_2|^2 \cdot P}{N_0}\right). \quad \text{Eq (5)}$$

$C_t$ is equal to the capacity of the link from station A to station C.

In frame t+1, signal s may carry packet 1, and signal r may carry packet 0. The received signal y may contain signal r carrying packet 0 from station B as well as signal s carrying packet 1 from station A. Station C may compute LLRs for packet 0 in signal r from station B based on the received signal y. However, signal r is interfered by signal s with power of $|h_2|^2 \cdot P$. The amount of received mutual information $C_{t+1}$ in frame t+1 may be expressed as:

$$C_{t+1} = \log\left(1 + \frac{|h_1|^2 \cdot P}{N_0 + |h_2|^2 \cdot P}\right). \quad \text{Eq (6)}$$

As shown in equation (6), the received signal component corresponding to signal s acts as interference and is reflected by the term $|h_2|^2 \cdot P$ added to noise $N_0$ in the denominator. The total received mutual information $C_{total}$ for packet 0 may be expressed as:

$$C_{total} = C_t + C_{t+1} = \log\left(1 + \frac{(|h_1|^2 + |h_2|^2) \cdot P}{N_0}\right). \quad \text{Eq (7)}$$

$C_{total}$ is equal to the capacity obtained with both stations A and B transmitting to station C and with $(|h_1|^2+|h_2|^2) \cdot P$ being the received power at station C. Station C can correctly decode packet 0 if it is sent at a data rate less than $C_{total}$.

After decoding packet 0, station C may cancel the interference due to signal r carrying packet 0 from received signal y to obtain an interference canceled signal. The interference canceled signal may include mostly signal s carrying packet 1 from station A. Station C may then compute LLRs for packet 1 based on the interference canceled signal. The amount of received mutual information, after the interference cancellation, may be as shown in equation (5). Station C may decode packet 1 as well as subsequent packets in similar manner.

The data rate from station A to station B is limited by $C_{AB}$. The data rate from stations A and B to station C is limited by $C_{total}$ since the total received power at station C is $(|h_1|^2+|h_2|^2) \cdot P$. The overall data rate R may be selected as follows:

$$R < \min[C_{AB}, C_{total}] \quad \text{Eq (8)}$$

The overall data rate R in equation (8) may achieve the capacity of an SFN network with transmitters at stations A and B.

For simplicity, the overall data rate R has been determined for a simply scenario with three stations A, B and C. The computation of the overall data rate may be extended to a relay network with any number of stations and any number of depths. In general, the data rate supported by a given station may be less than $C=\log(1+P_{RX}/N_0)$, where $P_{RX}$ is the total received power at that station from all detectable upstream stations operating in an SFN manner. The overall data rate may be the minimum of the supported data rates for all stations in the relay network. The overall data rate may also be larger than the minimum supported data rate for all stations, in which case a fraction of the stations may be out of coverage.

The transmission schemes shown in FIGS. 2 to 6 may be used for all or a portion of the system bandwidth. The system bandwidth may also be partitioned into multiple subbands, and different data streams may be sent on different subbands. This partitioning of the frequency resources may be beneficial for transmission of unicast data.

FIG. 8 shows a design of a process 800 for transmitting data in a relay communication network, e.g., a network supporting unicast, multicast and/or broadcast transmissions. Process 800 may be performed by a station, which may be a terminal, base station, etc. The station may receive at least one transmission in a first time interval from at least one station at a first depth in the relay network (block 812). The station may be at a second depth higher than the first depth. The station may also receive a first pilot from the at least one station at the first depth (block 814) and may derive a channel estimate for the at least one station based on the first pilot. The station may process the at least one transmission with the channel estimate to recover a packet from the at least one station at the first depth (block 816). The station may generate a transmission based on the recovered packet (block 818). The station may send the transmission in a second time interval after the first time interval (block 820). Stations at each depth in the relay network may send the same transmission in each time interval. The station may also transmit a second pilot (block 822). Stations at each depth may transmit the same pilot, and stations at different depths may transmit different pilots.

The relay network may comprise multiple depths. Stations at depth d may be able to successfully decode transmissions from stations at depth d−1 but not transmissions from stations at depth d−2 or lower, where d may be a non-negative value. Packets may be transmitted in a pipeline in the relay network. Transmissions of a packet may be sent by stations at progressively higher depth in successive time intervals.

The station may perform auto-configuration to determine its depth. In one design, the station may decode transmissions received from stations at each of at least one depth and may determine its depth based on decoding results. The station may decode transmissions received from stations at depth d, where d may be equal to the lowest depth 0 initially. If the transmissions from the stations at depth d are unsuccessfully decoded, then the station may decode transmissions received from stations at the next higher depth d+1. The station may set its depth to depth d+1 if the transmissions from the stations at depth d are successfully decoded.

FIG. 9 shows a design of an apparatus 900 for transmitting data in a relay communication network. Apparatus 900 includes a module 912 to receive at least one transmission in a first time interval from at least one station at a first depth in the relay network, a module 914 to receive a first pilot from the at least one station at the first depth, a module 916 to process the at least one transmission with a channel estimate derived from the first pilot to recover a packet from the at least one station at the first depth, a module 918 to generate a transmission based on the recovered packet, a module 920 to send the transmission in a second time interval from a station at a second depth higher than the first depth, with stations at each depth sending the same transmission, and a module 922 to transmit a second pilot, with stations at each depth transmitting the same pilot, and stations at different depths transmitting different pilots.

FIG. 10 shows a design of a process 1000 for sending synchronization signals in a relay communication network, which may support unicast, multicast and/or broadcast transmissions. Process 1000 may be performed by a station, e.g., a terminal or base station. The station may receive a first synchronization signal from at least one station at a first depth in the relay network (block 1012). The station may be at a second depth and may transmit a second synchronization signal (block 1014). The station may also receive a third synchronization signal from at least one station at a third depth. In general, the station may receive any number of different synchronization signals from stations at any number of depths, with stations at each depth transmitting the same synchronization signal. The station may identify the stations at each depth based on the synchronization signal for that depth.

In one design, the synchronization signals for different depths may comprise different pilots. These different pilots may be (i) generated with different scrambling codes or different orthogonal codes or (ii) multiplexed in frequency and/or time. The station may identify the stations at each depth, determine the depth of the stations, obtain timing information, and/or derive a channel estimate for the stations based on the synchronization signal for that depth. The station may also receive at least one transmission of a packet from the at least one station at the first depth. The station may process the at least one transmission based on a channel estimate to recover the packet from the at least one station at the first depth.

FIG. 11 shows a design of an apparatus 1100 for sending synchronization signals in a relay communication network. Apparatus 1100 includes a module 1112 to receive a first synchronization signal from at least one station at a first depth in the relay network, and a module 1114 to transmit a second synchronization signal from a station at a second depth in the relay network, with the stations at each depth transmitting the same synchronization signal.

FIG. 12 shows a design of a process 1200 for transmitting data with half-duplex operation in a relay communication network, which may support unicast, multicast and/or broadcast transmissions. Process 1200 may be performed by a station, e.g., a terminal or base station. The station may receive transmissions of packets in first frames from at least one station at a first depth in the relay network (block 1212). The station may be at a second depth higher than the first depth and may send transmissions of packets in second frames, which may be non-overlapping with the first frames (block 1214). The first frames may be even-numbered frames and the second frames may be odd-numbered frames, or vice versa.

The relay network may comprise multiple depths including the first and second depths. In one design, stations at odd depths may receive transmissions in the first frames and may send transmissions in the second frames. Stations at even depths may receive transmissions in the second frames and may send transmissions in the first frames. A station at the lowest depth may send transmissions in both the first and second frames. A station at the highest depth may receive transmissions in both the first and second frames.

In one design, all stations at the first depth may send transmissions in the first frames and may receive transmissions in the second frames. In another design, the stations at the first depth may be partitioned into first and second sets. The first set of stations may send transmissions in the first frames and may receive transmissions in the second frames. The second set of stations may send transmissions in the second frames and may receive transmissions in the first frames.

FIG. 13 shows a design of an apparatus 1300 for transmitting data with half-duplex operation in a relay communication network. Apparatus 1300 includes a module 1312 to receive transmissions of packets in first frames from at least one station at a first depth in the relay network, and a module 1314 to send transmissions of packets in second frames from a station at a second depth higher than the first depth, with the second frames being non-overlapping with the first frames.

The modules in FIGS. 9, 11 and 13 may comprise processors, electronics devices, hardware devices, electronics components, logical circuits, memories, etc., or any combination thereof.

Figure 14:
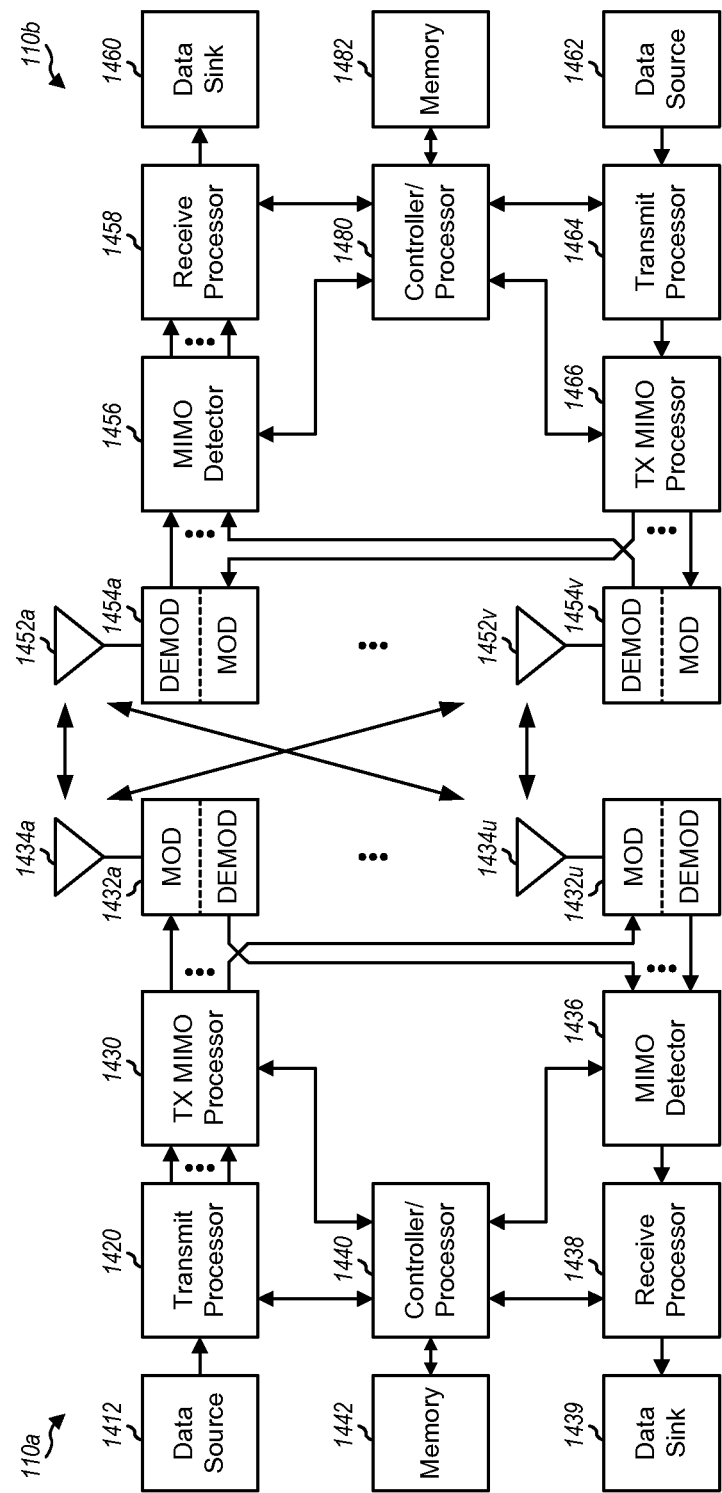
FIG. 14 shows a block diagram of two stations in the relay network.

FIG. 14 shows a block diagram of a design of two stations 110a and 110b, which may be any two stations in FIG. 1. In this design, station 110a is equipped with U antennas 1434a through 1434u, and station 110b is equipped with V antennas 1452a through 1452v, where in general U≥1 and V≥1.

At station 110a, a transmit processor 1420 may receive packets of data from a data source 1412 and control information from a controller/processor 1440. Transmit processor 1420 may process (e.g., encode, interleave, and modulate) the packets and control information and provide data symbols and control symbols, respectively. Transmit processor 1420 may also generate pilot symbols for a pilot and/or a synchronization signal for station 110a. A transmit (TX) multiple-input multiple-output (MIMO) processor 1430 may perform spatial processing (e.g., precoding) on the data symbols, the control symbols, and/or the pilot symbols, if applicable, and may provide U output symbol streams to U modulators (MODs) 1432a through 1432u. Each modulator 1432 may process a respective output symbol stream (e.g., for OFDM, SC-FDM, CDMA, etc.) to obtain an output sample stream. Each modulator 1432 may further process (e.g., convert to analog, amplify, filter, and upconvert) the output sample stream to obtain a radio frequency (RF) signal. U RF signals from modulators 1432a through 1432u may be transmitted via U antennas 1434a through 1434u, respectively.

At station 110b, antennas 1452a through 1452v may receive the RF signals from station 110a and may provide received signals to demodulators (DEMODs) 1454a through 1454v, respectively. Each demodulator 1454 may condition (e.g., filter, amplify, downconvert, and digitize) a respective received signal to obtain received samples. Each demodulator 1454 may further process the received samples (e.g., for OFDM, SC-FDM, CDMA, etc.) to obtain received symbols. A MIMO detector 1456 may obtain received symbols from all V demodulators 1454a through 1454v, perform MIMO detection on the received symbols if applicable, and provide detected symbols. A receive processor 1458 may process (e.g., demodulate, deinterleave, and decode) the detected symbols, provide decoded packets to a data sink 1460, and provide decoded control information to a controller/processor 1480.

At station 110b, packets of data from a data source 1462 and control information from controller/processor 1480 may be processed by a transmit processor 1464, precoded by a TX MIMO processor 1466 if applicable, further processed by modulators 1454, and transmitted via antennas 1452. At station 110a, the RF signals from station 110b may be received by antennas 1434, processed by demodulators 1432, detected by a MIMO detector 1436 if applicable, and further processed by a receive processor 1438 to recover the packets and control information transmitted by station 110b.

Controllers/processors 1440 and 1480 may direct the operation at stations 110a and 110b, respectively. Controllers/processors 1440 and 1480 may each perform or direct process 800 in FIG. 8, process 1000 in FIG. 10, process 1200 in FIG. 12, and/or other processes for the techniques described herein. Memories 1442 and 1482 may store data and program codes for stations 110a and 110b, respectively.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
    receiving at least one data transmission of at least one data packet in a first time interval from at least one first station at a first depth in a relay communication network, the at least one data transmission being broadcast by the at least one first station and received by a second station at a second depth higher than the first depth;
    decoding the received at least one data transmission to recover the at least one data packet from the at least one first station at the first depth, wherein the received at least one data transmission is different from timing synchronization beacons, wherein the decoding includes:
        decoding data transmissions received from stations at depth d, where d is equal to a lowest depth initially; and
        decoding data transmissions received from stations at next higher depth d+1 if the data transmissions from the stations at depth d are unsuccessfully decoded;
    generating a data transmission for the second station comprising the at least one data packet recovered from the at least one data transmission received from the at least one first station at the first depth;
    setting the second depth of the second station to depth d+1 if the data transmissions from the stations at depth d are successfully decoded; and
    estimating interference based on the recovered at least one data packet to generate an interference cancelled signal by sending the data transmission from the second station that receives the at least one data transmission from the at least one first station to a station that generates the interference to obtain estimated interference.

2. The method of claim 1, wherein data packets are transmitted in a pipeline in the relay network, and wherein data transmissions of a data packet are sent by stations at progressively higher depth in successive time intervals.

3. The method of claim 1, wherein the generating the data transmission comprises
    generating the data transmission for the second station at the second depth based on the at least one recovered data packet.

4. The method of claim 1, wherein the relay network comprises multiple depths including the first and second depths, and wherein stations at depth d are able to successfully decode data transmissions from stations at depth d−1 but not data transmissions from stations at depth d−2 or lower.

5. The method of claim 1, further comprising:
    decoding data transmissions received from stations at each of at least one depth; and
    determining the second depth of the second station based on decoding results.

6. The method of claim 1, further comprising:
    receiving a first pilot from the at least one first station at the first depth; and transmitting a second pilot from the second station at the second depth, wherein stations at each depth transmit the same pilot and stations at different depths transmit different pilots.

7. An apparatus for wireless communication, comprising: at least one processor configured to receive at least one data transmission of at least one data packet in a first time interval from at least one first station at a first depth in a relay communication network, the at least one data transmission being broadcast by the at least one first station and received by a second station at a second depth higher than the first depth, to decode the received at least one data transmission to recover the at least one data packet from the at least one first station at the first depth, wherein the received at least one data transmission is different from timing synchronization beacons, wherein configuration to decode includes configuration to decode data transmissions received from stations at depth d, where d is equal to a lowest depth initially, and configuration to decode data transmissions received from stations at next higher depth d+1 if the data transmissions from the stations at depth d are unsuccessfully decoded, to generate a data transmission for the second station comprising the at least one data packet recovered from the at least one data transmission received from the at least one first station at the first depth, and to broadcast the data transmission in a second time interval from the second station at the second depth, to set the second depth of the second station to depth d+1 if the data transmissions from the stations at depth d are successfully decoded, and to estimate interference based on the recovered at least one data packet to generate an interference cancelled signal by sending the data transmission from the second station that receives the at least one data transmission from the at least one first station to a station that generates the interference to obtain estimated interference.

8. The apparatus of claim 7, wherein the at least one processor is configured to receive a first pilot from the at least one first station at the first depth, and to transmit a second pilot from the second station at the second depth, wherein stations at each depth transmit the same pilot and stations at different depths transmit different pilots.

9. An apparatus for wireless communication, comprising:
means for receiving at least one data transmission of at least one data packet in a first time interval from at least one first station at a first depth in a relay communication network, the at least one data transmission being broadcast by the at least one first station and received by a second station at a second depth higher than the first depth;
means for decoding the received at least one data transmission to recover the at least one data packet from the at least one first station at the first depth, wherein the received at least one data transmission is different from timing synchronization beacons, wherein the means for decoding includes:
means for decoding data transmissions received from stations at depth d, where d is equal to a lowest depth initially; and
means for decoding data transmissions received from stations at next higher depth d+1 if the data transmissions from the stations at depth d are unsuccessfully decoded;
means for generating a data transmission for the second station comprising the at least one data packet recovered from the at least one data transmission received from the at least one first station at the first depth means for broadcasting the data transmission in a second time interval from the second station at the second depth;
means for setting the second depth of the second station to depth d+1 if the data transmissions from the stations at depth d are successfully decoded; and
means for estimating interference based on the recovered at least one data packet to generate an interference cancelled signal by sending the data transmission from the second station that receives the at least one data transmission from the at least one first station to a station that generates the interference to obtain estimated interference.

10. The apparatus of claim 9, further comprising:
means for receiving a first pilot from the at least one first station at the first depth; and
means for transmitting a second pilot from the second station at the second depth, wherein stations at each depth transmit the same pilot and stations at different depths transmit different pilots.

11. A non-transitory computer-readable medium comprising:
code for causing at least one computer to receive at least one data transmission of at least one data packet in a first time interval from at least one first station at a first depth in a relay communication network, the at least one data transmission being broadcast by the at least one first station and received by a second station at a second depth higher than the first depth;
code for causing the at least one computer to decode the received at least one data transmission to recover the at least one data packet from the at least one first station at the first depth, wherein the received at least one data transmission is different from timing synchronization beacons, wherein the code for causing the at least one computer to decode includes:
code for causing the at least one computer to decode data transmissions received from stations at depth d, where d is equal to a lowest depth initially; and
code for causing the at least one computer to decode data transmissions received from stations at next higher depth d+1 if the data transmissions from the stations at depth d are unsuccessfully decoded;
code for causing the at least one computer to generate a data transmission for the second station comprising the at least one data packet recovered from the at least one data transmission received from the at least one first station at the first depth;
code for causing the at least one computer to broadcast the data transmission in a second time interval from the second station at the second depth;
code for causing the at least one computer to set the second depth of the second station to depth d+1 if the data transmissions from the stations at depth d are successfully decoded; and
code for causing the at least one computer to estimate interference based on the recovered at least one data packet to generate an interference cancelled signal by sending the data transmission from the second station that receives the at least one data transmission from the at least one first station to a station that generates the interference to obtain estimated interference.

* * * * *